United States Patent [19]
Breck, Jr. et al.

[11] 3,973,658
[45] Aug. 10, 1976

[54] CLUTCH CONTROL MEANS FOR A PNEUMATIC NEEDLE POSITIONER

[75] Inventors: William Louis Breck, Jr.; Jack L. Pickle, both of El Paso, Tex.

[73] Assignee: Farah Manufacturing Company, Inc., El Paso, Tex.

[22] Filed: Dec. 12, 1973

[21] Appl. No.: 424,071

Related U.S. Application Data

[62] Division of Ser. No. 264,131, June 19, 1972, Pat. No. 3,805,930.

[52] U.S. Cl. ............................... 192/86; 192/104 F
[51] Int. Cl.² ...................................... F16D 43/284
[58] Field of Search ............ 192/86, 103 FA, 104 F

[56] References Cited
UNITED STATES PATENTS

| | | |
|---|---|---|
| 2,144,074 | 1/1939 | Maybach ................ 192/103 FA X |
| 2,381,786 | 8/1945 | Tyler ...................... 192/103 FA X |
| 2,482,460 | 9/1949 | Browne.................... 192/103 FA X |
| 3,352,395 | 11/1967 | Hilpert ............................. 192/104 F |

*Primary Examiner*—Benjamin W. Wyche
*Attorney, Agent, or Firm*—Curtis, Morris & Safford

[57] ABSTRACT

A machine comprising a rotary drive shaft and a pneumatically operated clutch: a plurality of pressure chambers to which air is supplied for controlling said clutch; means for varying the air pressure in one of said chambers corresponding to the speed of rotation of said shaft and comprising centrifugally controlled valve means mounted on said shaft for rotation therewith and connected to said one of said chambers to cause a build up of pressure in said one of said chambers corresponding to the rotational speed of said drive shaft.

1 Claim, 11 Drawing Figures

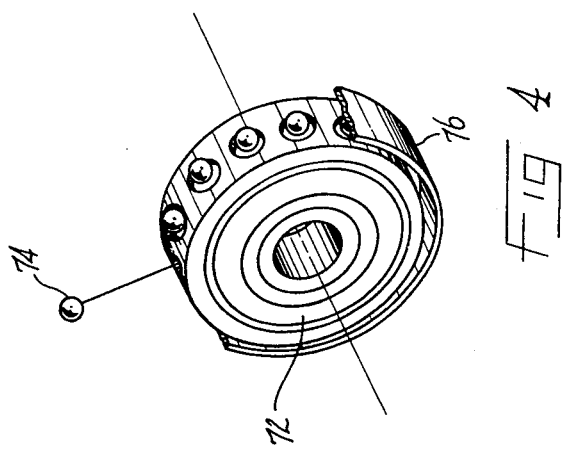
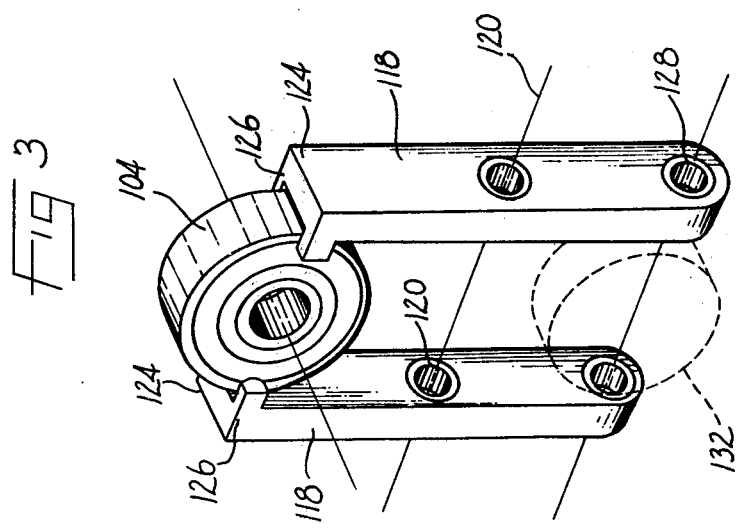

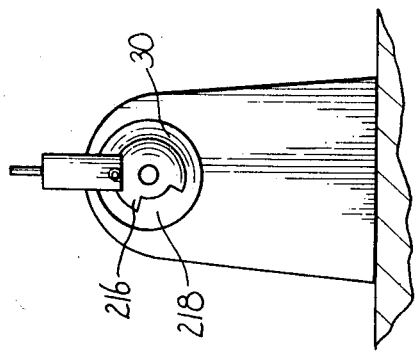
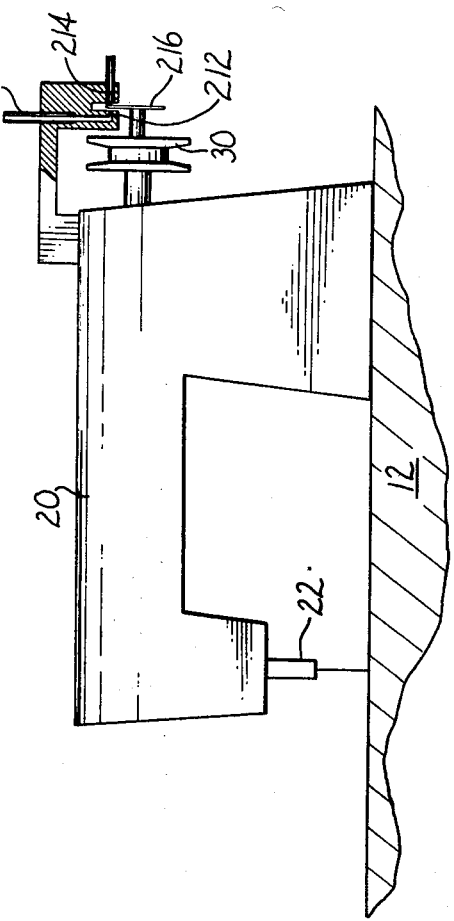

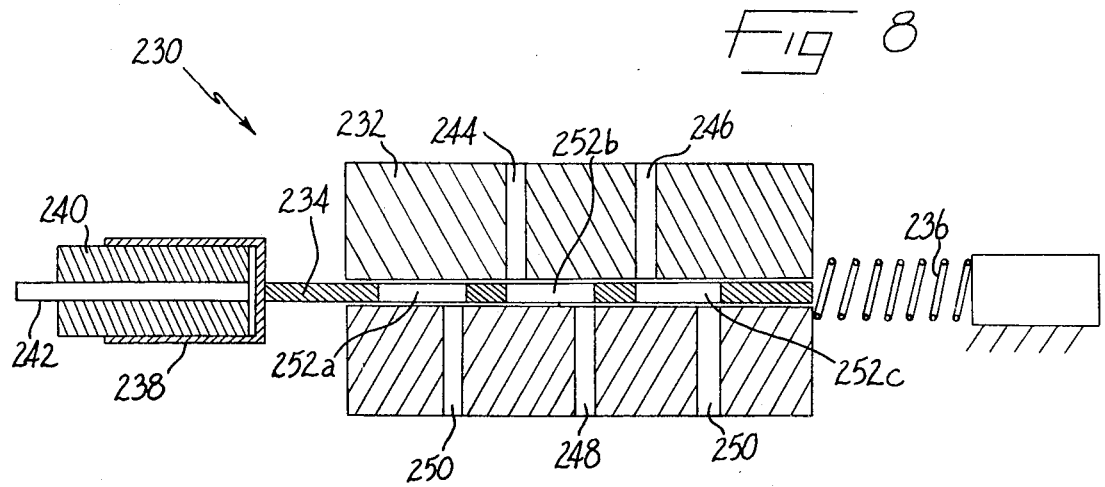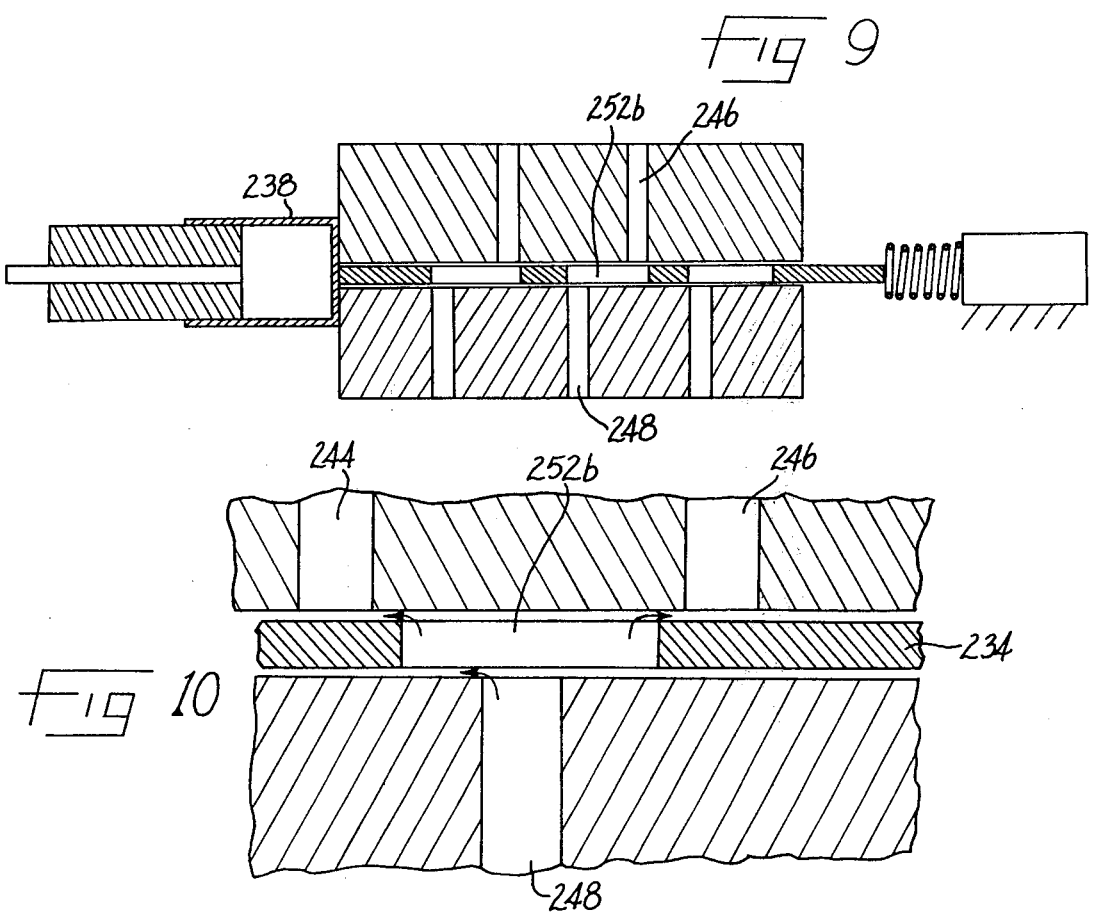

CLUTCH CONTROL MEANS FOR A PNEUMATIC NEEDLE POSITIONER

This is a division of application Ser. No. 264,131, filed June 19, 1972 now U.S. Pat. No. 3,805,930.

The present invention relates to a rotary drive arrangement adapted to stop a work element in a predetermined position, and more particularly, to a drive and stop motion apparatus for driving the needle bar of a sewing machine at a controlled speed and for stopping the needle bar in a predetermined position.

In performing automatic sewing operations, particularly in industrial sewing with conventional machines, it is necessary to control carefully the speed at which the machines are operated in order to perform various sewing operations with a single machine. Further, it is often necessary to position the sewing needle selectively in an up or down position with respect to the sewing surface and looper when the machine is stopped. The "up" position is required when the operator wishes to remove the work or to make necessary thread adjustments and the "down" position is required when the operator wishes to turn or pivot the workpiece about the engaged needle so as to permit continued sewing in a different direction. In the absence of a positioning control, the needle bar may stop in the up or down position or any intermediate position, and the operator with conventional machines is required to manually adjust the machine to raise or lower the needle bar to the desired position by turning the handwheel of the sewing machine. This relatively slow manual adjustment consumes a great deal of the operator's time and substantially increases the cost of the article being manufactured.

It has previously been proposed to eliminate the manual adjustment of the sewing machine by utilizing automatic or semi-automatic electrical and mechanical stop motion devices for the sewing machine. However, most of the previously proposed devices are of substantially complex construction, require extensive modification of the sewing machine itself, and in some cases, are suitable only for particular types of sewing machines for which they are designed. A number of such previously proposed devices utilize auxiliary motors to provide final rotation of the drive shaft at the end of the sewing operation to bring it into the proper position associated with the up or down position of the needle bar when the sewing machine is stopped. Other devices utilize electronic control circuits for the drive motors of the sewing machine or for engaging and disengaging pawls and cams attached to the drive shaft of the sewing machine.

In accordance with one aspect of the present invention, the above-mentioned problems are avoided by the use of a pneumatic drive and stop motion, or needle position control, device adapted to control the speed and position of a needle bar in a sewing machine, through the drive shaft of the machine, and to stop the needle bar in a predetermined position at the completion of the sewing operation. This device includes a motor having a driven power output member, such as a flywheel, and a controlled member, such as a disc, operatively connected to the drive shaft of the sewing machine and movable axially for selective engagement with either the flywheel or a stationary braking surface in the machine to transmit either driving or braking force to the drive shaft and thus to the needle bar.

The main feature of the present invention provides for selective movement of the controlled member into and out of engagement with the flywheel and the braking force. The means for moving the controlled member, which will hereinafter be referred to as the disc, includes two pneumatic chambers with a wall, or piston, between them and responsive to differential pressure between chambers to move away from the chamber having greater pressure and toward the chamber having less pressure. This piston is connected to the disc to move the latter toward the flywheel in response to the greater pressure in the first chamber, referred to as the clutch chamber, and to move the disc in the opposite direction toward the braking surface in response to greater pressure in the second chamber, referred to as the braking chamber.

Air passing through a pneumatic line to the clutch chamber is vented to a greater or lesser degree by a valve controlled by the operator. In the absence of any forward pressure by the operator, light mechanical spring pressure urges the disc into engagement with the braking surface to hold the needle bar stationary although under such light braking force that it can easily be moved by turning the handwheel of the sewing machine. When the operator applies pressure to the forward motion control, usually a foot pedal, the poppet valve that controls venting of air from the line to the clutch chamber is pressed more tightly toward a closed position thus allowing a build-up of air pressure in the clutch chamber. This air pressure moves the piston which in turn moves the disc into frictional engagement with the flywheel. The rotary motion of the flywheel is transmitted by the disc to the shaft on which the disc is mounted from there by a belt drive mechanism and other standard motion transmission devices to the needle bar.

A rotating transducer valve is connected to the line that supplies pneumatic pressure to the braking chamber and is mechanically actuated by rotation of the shaft on which the disc is mounted. When that shaft is stationary, this valve is open to vent air away from the braking chamber so that the disc will be able to move to engagement with the flywheel as soon as the forward motion control is actuated gy the operator. As the disc speeds up, centrifugal force causes the rotary valve to close more firmly, allowing greater back pressure to be built up and to be applied to the braking chamber, thus acting as a transducer by producing pressure proportional to speed. This counteracts the pressure in the clutching chamber and reduces the force driving the disc into engagement with the flywheel, soon reaching a condition in which just enough pressure is applied to cause the disc to engage the flywheel with a force that will allow sufficient slippage so that the disc will be driven at a speed determined by the operator. It the operator changes pressure on the speed control of the machine, the forces on the disc will shift to a new balance point that allows either greater or less slippage of the disc with respect to the flywheel and thus causes the needle bar to be driven either more slowly or more rapidly.

Complete release of pressure on the speed control removes pressure from the clutching chamber and leaves pressure initially in the braking chamber, thereby driving the disc into engagement with the braking surface and causing it to decelerate sharply.

Still another valve is provided in the pneumatic line leading to the braking chamber to allow that chamber to receive air either under control of the centrifugal valve that operates as a speed transducer or by way of an amplifying valve. The latter is pneumatically controlled by air that must pass an interrupting valve and a venting valve. The latter is opened when the speed control is moved to any forward speed, thereby closing off the amplifying valve so that no air can pass through it and reach the braking chamber. When the speed control is moved to the braking position, this latter venting valve is closed and the air that would otherwise be vented passes through the interrupting valve, which may consist of a circular plate attached to rotate with the shaft that drives the needle bar. The circular plate has a segment removed so that air to control the amplifying valve can pass through this segment and actuate the amplifying valve only during a specific limited range of positions of the needle bar. This range of positions can be set to correspond to either the up or down positions of the needle. When air passes through the open segment, the amplifying valve is controlled to apply air to the braking chamber to cause rotation of the disc to stop. However, if the disc cannot be brought to a halt while the segment is in position to allow the passage of air to the amplifying valve control section, the amplifying valve will be turned off and no further braking pressure will be applied to the disc until the needle bar shaft again reaches a position that allows air to pass through the missing segment of the circular plate in the interrupting valve. This again renders the amplifying valve operative and applies further pneumatic pressure to the braking chamber. Since the disc was previously slowed down substantially, this second application of braking force will normally bring it to a complete halt with the needle in the desired range of positions.

The above and other features and advantages of this invention will be apparent in the following detailed description of illustrative embodiments thereof which are to be read in connection with the accompanying drawings wherein:

FIG. 3 is a perspective view of a portion of the clutch control arrangement;

FIG. 4 is a perspective view, with parts broken away, of the bearing assembly in which the drive shaft of the apparatus is mounted;

FIG. 6 is an enlarged side view, partly in section, of the sewing machine head and a portion of the needle positioning pneumatic circuit;

FIG. 7 is an end view taken along line 7—7 of FIG. 6;

FIG. 8 is an enlarged sectional view of a pneumatic amplifier valve which is adapted to be used in the pneumatic circuit of the present invention, showing the valve in its "exhaust" position;

FIG. 9 is a sectional view similar to FIG. 8, showing the configuration of the valve in its "amplifying" position;

FIG. 10 is an enlarged partial sectional view similar to FIGS. 8 and 9, showing the position of the valve slide plate intermediate the exhaust and amplifying positions of the valve.

Figure 1:
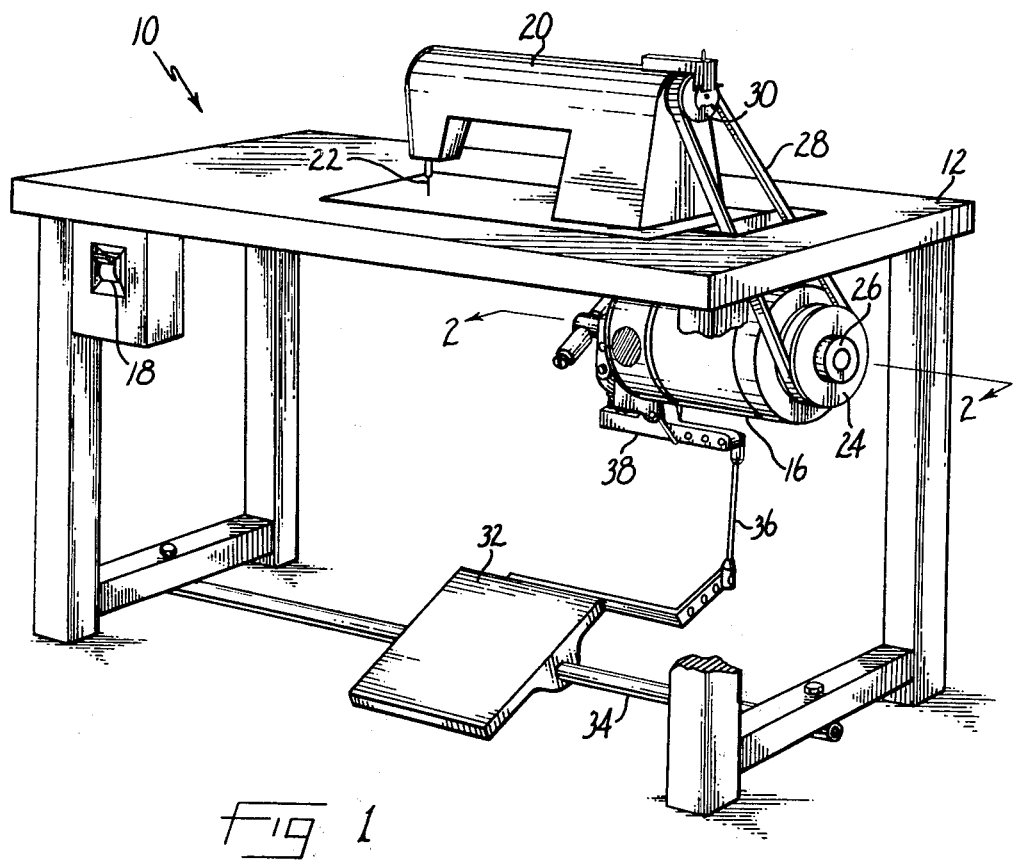
FIG. 1 is a schematic perspective view of a sewing machine having a pneumatic drive and needle positioner constructed in accordance with the present invention.

Referring now to the drawings in detail, and initially to FIG. 1 thereof, it will be seen that a sewing machine 10 embodying the present invention, as shown therein, has a supporting base or frame 12 on which an electric motor 16, selectively operable through a power switch 18, is mounted. Motor 16 provides the power required to drive the sewing machine head 20 and reciprocate a needle bar 22 therein during the sewing operation.

Power from motor 16 is transmitted through a pulley 24, secured to the end of a drive shaft 26 in the motor, and connected through a belt 28 to a pulley 30 secured to a drive shaft within sewing machine head 20. The rotary power from pulley 30 and the shaft on which it is secured are transmitted and converted to reciprocal motion through a conventional transmission system (not shown) within the standard head 20 in order to reciprocate needle bar 22 with respect to frame 12 and the looper of the sewing machine.

The speed of operation of the sewing machine is controlled by a conventional foot pedal 32 pivotally mounted on a cross bar 34 in frame 12. Pedal 32 is pivotally connected through a link 36, to a lever 38 which controls a plurality of valves in a pneumatic circuit for actuating a combined clutch and brake disc with motor 16, as will be more fully described hereinafter, to control the movement and the stopping of output shaft 26.

Figure 2:
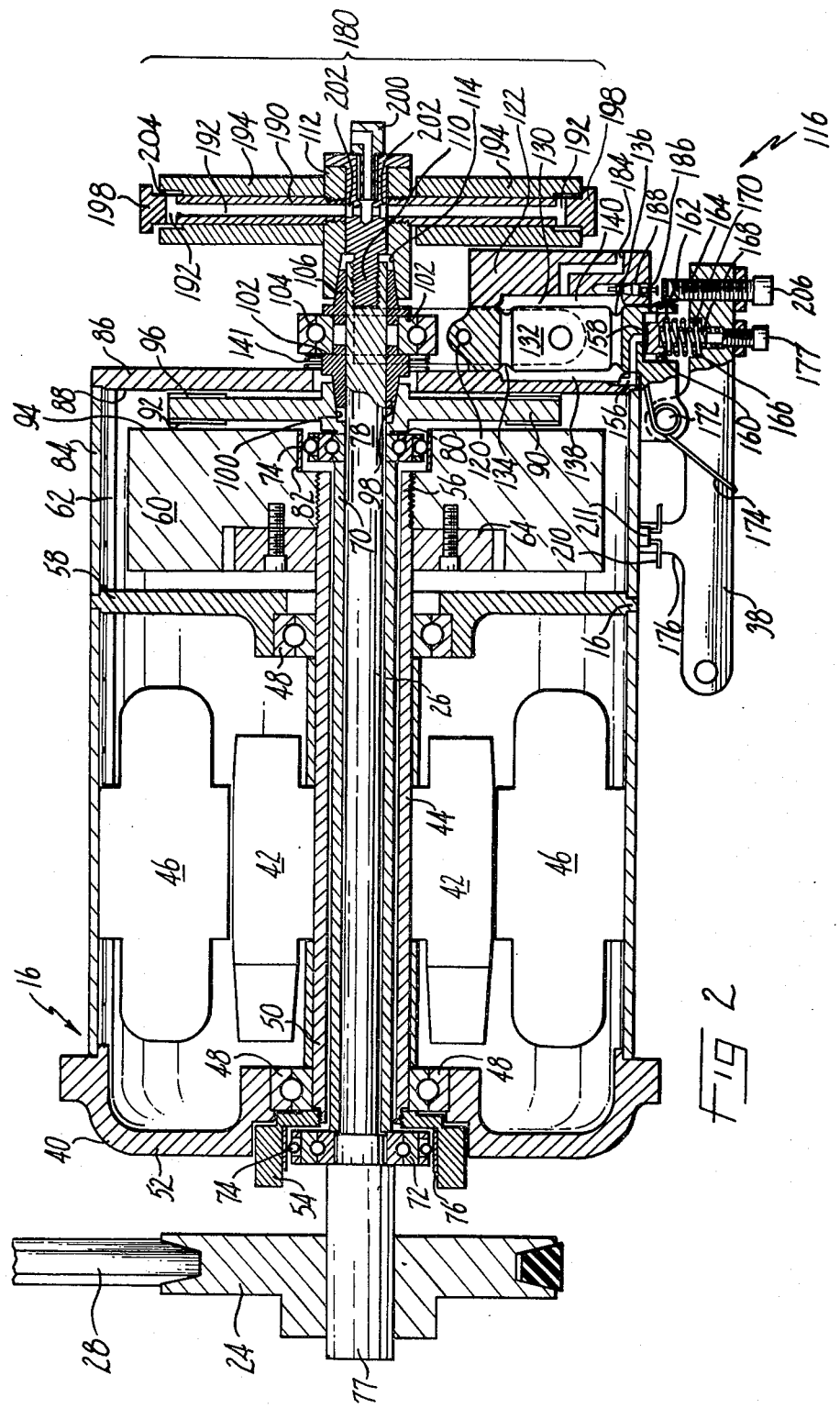
FIG. 2 is a sectional valve taken along line 2—2 of FIG. 1, illustrating the structural arrangement of one embodiment of the pneumatic drive and pneumatic needle positioner constructed in accordance with the invention.

As shown in FIG. 2, motor 16 includes a rigid housing 40 which encloses a rotor 42 to which a hollow shaft 44 is connected to be turned by the rotor. Rotor 42 and shaft 44 are rotated in the conventional manner by interaction with electrical windings 46 surrounding the rotor. Shaft 44 is rotatably supported in housing 40 by a pair of ball bearings 48. One end 50 of the shaft extends through one of the bearings 48 mounted in the end bell 52 of housing 40 and is threadedly connected to a bearing housing 54. The opposite end 56 of shaft 44 extends through the other bearing 48, which is mounted in a dividing wall 58, and is threadedly connected to a relatively heavy annular power output flywheel 60 in a chamber 62 of the housing.

Flywheel 60 is rigidly connected to shaft 44 by a conventional split clamp 64 which tightly engages the shaft and is bolted to the flywheel, as illustrated in FIG. 2. In this manner, whenever motor 16 is operated, rotor 42, shaft 44 and flywheel 60 are simultaneously rotated. It is noted that because of the threaded connection of flywheel 60 with shaft 44 the axial position of the flywheel on the shaft may be adjusted as necessary in order to accommodate the clutch member described hereinafter.

Power output shaft 26 extends through hollow shaft 44 in a sleeve 70. The left end of shaft 26, as seen in FIG. 2, is supported in a ball bearing 72 having steel balls 74 (see also FIG. 4) on its outer peripheral surface. Balls 74 engage and move axially to a limited extent within a race 76 secured to the inner surface of bearing housing 54. By this arrangement, shaft 26 can be moved axially of bearing housing 54 by the operation of the clutch while shaft 44 is rotated. At the same time the shaft 26 can rotate freely at a different speed than the shaft 44 and flywheel 60 or can even remain stationary. The free end 77 of shaft 26 is secured to pulley 24 which drives the transmission in the sewing machine head through the belt 28 as described above. The right end 78 of shaft 26 extends beyond sleeve 70, through flywheel 60, and is supported in the flywheel by a ball bearing 80 having a race 82 and being similar in construction to the bearing 72 discussed above.

Flywheel 60 is surrounded within chamber 62 by an extension 84 of housing 16 and the end of the housing, beyond wall 58, is closed by a fixed rigid wall 86 which provides a flat braking surface 88 on the interior of chamber 62. An annular disc 90 is secured to shaft 26 between flywheel 60 and braking surface 88 has a first friction surface 92 adapted to engage the surface 94 of the flywheel and a second friction surface 96 adapted to engage braking surface 88 so that the shaft 26 will be selectively driven by flywheel 60 or stopped by braking surface 88 depending upon the axial position of the disc 90.

Disc 90 is secured to shaft 26 through a conventional tapered slit clamp 98 which is received within a tapered axial aperture 100 at the center of the disc. Split clamp 98, on the side thereof opposite disc 90, is provided with an annular shoulder 102 on which an annular ball bearing 104 is seated. Bearing 104 is utilized to reciprocate shaft 26 and thus disc 90 in an axial direction selectively to engage the clutch surfaces with either flywheel surface 94 or brake surface 88, as is more fully described hereinafter. A second tapered split ring clamp 106, similar in construction to clamp 98, is also mounted on end 78 of shaft 26 and has a shoulder portion 102 for providing additional support to bearing member 104. Radial compression of the tapered split clamps 98, 106, to secure the clamps to the shaft 26, is provided by a bolt 110 threadedly secured to shaft 26. The bolt 110 extends through a transducer body 112 that has a tapered reentrant surface 114. Tightening the bolt 110 causes the reentrant surface 114 to engage the tapered surface of clamp 106 and apply radial and axial pressure thereto. As a result, clamp 106 is tightened on shaft 26 and is urged to the left to grasp bearing 104 tightly by means of shoulders 102. At the same time clamp 98 is forced into tapered portion 100 of disc 90, thereby compressing clamp 98 and tightly engaging it with 26. In this manner, disc 90 is rigidly connected to shaft 26, through tapered split clamp 98, in order to transmit the driving power of flywheel 60 to shaft 26 upon engagement of friction surface 92 with flywheel surface 94 or to stop shaft 26 upon engagement of the friction surface 96 with brake surface 88. Ultimately, axial pressure by the bolt 110 forces the sleeve 70 against the inner race of the bearing 72, and this inner race is retained by an integral shoulder of the shaft 26.

Disc 90 is operated by an actuating mechanism 116 which provides the principal features of the present invention. Actuator 116 includes a pair of lever arms 118 (FIG. 3) which are pivotally mounted at 120 in a piston housing 122 secured to the side wall 86 of motor housing 16. The upper ends 124 of levers 118 have opposed flanges 126 which surround bearing 104 to urge the bearing, and thus split ring clamps 98, 106 and shaft 26 in an axial direction upon pivotal motion of the levers 118. The pivotal motion required to move disc 90 between its clutch position and its brake position is slight, so that ends 124 of levers 118 move through only a small arcuate path which is essentially straight. A certain looseness of fit can be provided between the bearings 104 and the fingers or flanges 126 to accommodate this slight arcuate motion, but even this looseness may be minimized by rounding the juxtaposed surfaces of the fingers 126.

The lower ends 128 of the levers 118 extend along housing 122 and are pivotally connected to a shaft passing through the piston 132 within the housing 122. Piston 132 is supported within housing 122 by a pair of flexible rolling diaphragms 134, 136 on opposite sides thereof. These diaphragms extend between the chambers 138 and 140, respectively, and the piston 132. These chambers are selectively supplied with pressurized air, as will be more fully described hereinafter, in order to move piston 132 to the right or left within the housing 122, as illustrated in FIG. 2, thereby to pivot levers 118 and move disc 90. In this manner, when the pressure in chamber 138 is greater than the pressure in chamber 140, levers 118 are pivoted in counterclockwise direction so as to engage the first friction surface 92 with surface 94 of flywheel 60 to cause drive shaft 26 to be driven by the flywheel. Chamber 138 may, therefore, be referred to as the clutch chamber. On the other hand, when the pressure in chamber 140 is greater than the pressure in chamber 138, levers 118 are pivoted in a clockwise direction so that friction surface 96 is brought into contact with brake surface 88 to slow or stop the rotation of shaft 26. Chamber 140 is referred to as the brake chamber. It is noted that a spring 141 may be positioned between the end 86 of housing 16 and bearing 104 to bias the friction surface 92 lightly against the brake surface 88 when no air is present in either of chambers 138 and 140, thereby holding drive shaft 26 and thus needle bar 22 in a fixed position when the sewing machine is not operated. This arrangement also prevents disc 90 from creeping when motor 16 is running and the air to the control assembly 116 is turned off. However, the pressure of spring 141 required for these purposes is slight, so that the sewing machine may be operated manually, as for example by rotation of pulley 30, if it is necessary.

Air is supplied to chambers 138 and 140 from a source of pressurized air 142 (FIG. 5) through an air pressure regulator/filter 144 and a three way valve 146. Valve 146 distributes pressurized air from regulator 144 through three lines 148, 150 and 152. The air supplied to line 148 is directed through a restriction 154 in the line to chamber 138 through an aperture (not shown) in housing 122. It is to be understood that the specific details of the connections and valves utilized in the pneumatic circuit of the present invention would occur to those skilled in the art from the schematic illustration of FIG. 5 and therefore are not illustrated in detail.

Air supplied to chamber 138 from line 148 may selectively escape through an exhaust port 156, formed in housing 122, in order to vent chamber 138 or to vary the pressure therein. As shown in FIG. 2, exhaust port 156 is closed at its free end 158 by a poppet valve 160 which is adapted to reciprocate in a cylindrical enclosure 162 formed in housing 122. The top surface of poppet 160 is adapted to seat against the top chamber 162 to close exhaust port 156 when the poppet is in its uppermost position. A port 164 in the side wall of enclosure 162 is provided to permit the exhaust of air that reaches an annular space around poppet 160.

Poppet 160 is supported in chamber 162 by a pair of springs 166 and 168 which are engaged at one end with the lower surface of poppet 160 and at their other ends with a recess 170 formed at one end of lever 38. The latter is pivotally mounted on motor housing 16 by a pin 172 and is spring biased in a counterclockwise direction, as seen in FIG. 2, by a spring 174. A stop 176 limits the clockwise motion of lever 38 under the influence of spring 174. Spring 166 is constructed so that it applies no force to poppet 160 but merely rests in its seat when lever 38 is in the position shown. However, spring 168 exerts a reference force against poppet 160 in this position to keep the exhaust port 156 closed until a reference air pressure, which applies a force to poppet 160 equal to the force of spring 168, develops within chamber 138 as air is supplied to the valve assembly 180 from source 142. If the pressure supplied to chamber 138 is greater than the reference force applied to poppet 160, poppet 160 will move downwardly against the force of spring 168 causing the excess pressure to be bled off through port 164, so that only the reference pressure is maintained in the chamber. This reference pressure may be varied in accordance with the particular application of the machine and the lowermost speed at which the machine is to be operated, as described hereinafter, by means of a screw adjusting member 176 which, when tightened, will increase the force applied to poppet 160 by spring 168.

Increasing the air pressure within chamber 138 is accomplished by operation of foot pedal 32, which, through link 36, causes lever 38 to pivot in a counterclockwise direction, thereby causing spring 166 to apply to poppet 160 higher pressure than the reference pressure applied by spring 168. As a result, the increased force holds poppet 160 against port 156 until a sufficient pressure is built up in chamber 138 to equal this increased force. Any further increase in pressure simply causes air to bleed off through port 164. In this manner, pressure at levels above the reference pressure can be selectively obtained within chamber 138 by actuation of pedal 32. The greater the pivotal motion of foot pedal 32 under the operation of the operator, the greater will be the force applied to the poppet by spring 166 and thus the greater the pressure in chamber 138. In this manner, spring 166 and poppet 160 act as a variable pressure regulator for chamber 138 through which the operator can adjust the amount of force exerted by friction surface 92 on flywheel surface 94.

During this portion of the operation of the device, air is also supplied in generally corresponding varying pressures to chamber 140, in order to counteract the pressure in chamber 138. However, the pressure supplied thereto is less than the pressure in chamber 138 so as to insure that the disc 90 is maintained against flywheel 60 for driving the shaft. The pressure on the braking side of piston 132, i.e. in chamber 140, provides a more gradual and less sensitive pressure/speed relationship between the foot pedal and the drive shaft, which makes it easier for the operator to hold a random, controlled speed with adjustment of foot pedal 32. The means by which the pressure in the braking chamber 140 is developed will be described hereinafter.

Air supplied to chamber 140 passes from three way valve 146 to line 150 and thence through a restriction 178 in the line. Line 150 is connected to a hollow pressure transducer or exhaust valve assembly 180 and to a line 182 through which air, downsteam of restriction 178, passes to a valve 183 and conduit 184 to chamber 140. An exhaust port 186 is formed in the cover of housing 122, as seen in FIG. 2, and closed by a poppet valve 188 in order to selectively evacuate chamber 140.

Transducer 180 constitutes a centrifugally operated, rotary slide valve arrangement, seen most clearly in FIG. 2, which includes at least one and preferably two diametrically opposed hollow transducer stems 190 having exhaust ports 190 formed therein communicating with the atmosphere at their radially outermost portions beneath the enlarged heads 198 of the stems. The latter are threadedly connected to transducer body 112, and a pair of weights 194 are slidably mounted on either side of the transducer stem bodies. Weights, or slides, 194, which in their outermost position illustrated at the bottom of FIG. 2 are held in position by heads 198, are counterbored at their outer ends to form enclosed air spaces about the respective stem 190 and exhaust ports 192. Air supplied to transducer 180 passes to stems 190 through a suitably rotary air fitting 200, which is of conventional construction, and from the fitting through ports 202 in the bolt.

In the embodiment in FIG. 2, when the shaft 26 is stationary, the uppermost weight 194 slides downwardly on its stem 190 to open the upper port 192. As the shaft is rotated, for example, in response to frictional engagement between the friction surface 92 and the surface 94 due to reference pressure in chamber 138 or any pressure thereabove, the air passing through restriction 178 in line 150 flows to transducer 180 and, through line 182, to brake chamber 140. Centrifugal force causes the weights 194 to slide out along the stems 190, which closes the ports 192. However, at or below the reference speed, air supplied to the transducer will escape through the ports 192 and through the counterbored space and the openings 204 formed between the enlarged heads 198 and the outer ends of the weights 194. This reduces the residual pressure in line 182 downstream of restriction 178 and reduces the pressure in the brake chamber 140. Increased pressure in the clutch chamber 138 combined with reduced pressure in the brake chamber 140 causes the disc 90 to press more firmly against the surface 94. However, as the pressure in chamber 138 is increased by actuation of foot pedal 32, as described above, the increased speed of rotation of shaft 26 increases the centrifugal force on weights 194 and thus restrains venting of air through the ports 192. This means that a higher pressure will be reached in the transducer 180 and in the chamber 140, causing a greater force in the braking direction to be applied to the piston 132. This greater force balances part of the force produced by the higher pressure in the chamber 138 and results in a net balance such that the disc 90 presses somewhat more firmly than before on the surface 94 of the flywheel allowing less slippage.

During operation of the device, particularly at the initiation of operation of the machine at a low selected random speed, it is possible for the maximum brake pressure from transducer 180 to momentarily exceed the pressure present in chamber 138. This will occur as the machine accelerates so that the force of the air pressure in chamber 140 overcomes the force of the air pressure in chamber 138, thereby causing the clutch to engage the brake surface 88 to slow down the shaft. As the machine slows down, the amount of air escaping through opening 204 will increase, thereby lowering the pressure in chamber 140 below that in chamber 138 so that shaft 26 is again driven by the engagement of friction surface 92 with flywheel 60. This cycle is repeated until the machine reaches a steady state at which air pressure gradually bleeds out of ports 192 through openings 204 at the same rate at which the shaft is tending to accelerate under the influence of disc 90, thereby reducing pressure of the friction surface 92 against surface 94 of the flywheel 60 and driving the output shaft at a controlled constant speed.

In order to achieve still higher speeds, valve 188 in exhaust port 186 of chamber 140 can be opened to exhaust all pressure from chamber 140, irrespective of the operation of the transducer 180. The valve 188 is located adjacent one end of lever 38 in position to be contacted by a pin or bolt 206. When lever 38 has been pivoted through a predetermined arc, the free end of bolt 206 engages valve 188, which may be a valve similar to a conventional tire valve, to open the valve and exhaust any air pressure within chamber 140. In this manner, the pressure in chamber 140, which opposed the pressure in chamber 138, is relieved so that full pressure in chamber 138 now acts on piston 132 in order to engage the friction surface 92 tightly with the surface of the flywheel and substantially increase the speed of operation of the sewing machine. The rotational speed of the device at which valve 188 is operated is variable by varying the length of that portion of bolt 206 extending upwardly of lever 38.

The drive system is utilized with an additional control mechanism for stopping drive of shaft 26 in a predetermined position, for example, when the needle bar is in a raised position. This is shown schematically in FIG. 5 by the provision of an additional air line 208 connected to air line 152. Air line 208 has a restriction 210, which is also in FIG. 2, therein and an exhaust port 211 downstream of the restriction. Port 211 is normally opened during the operation of the device, that is, when lever 38 is pivoted downwardly away from housing 16, so that all of the air supplied through line 152 is exhausted through restriction 210, exhaust port 211 and an amplifier valve 220 which is normally connected to exhaust. This is conveniently accomplished by locating a portion of the line 208 on stop extension 176 of lever 38, with the exhaust port located to engage the adjacent surface of housing 16. The latter may be provided with a valve seat or the like to prevent air from escaping port 211 when the port is closed as shown in FIG. 2.

Figure 5:
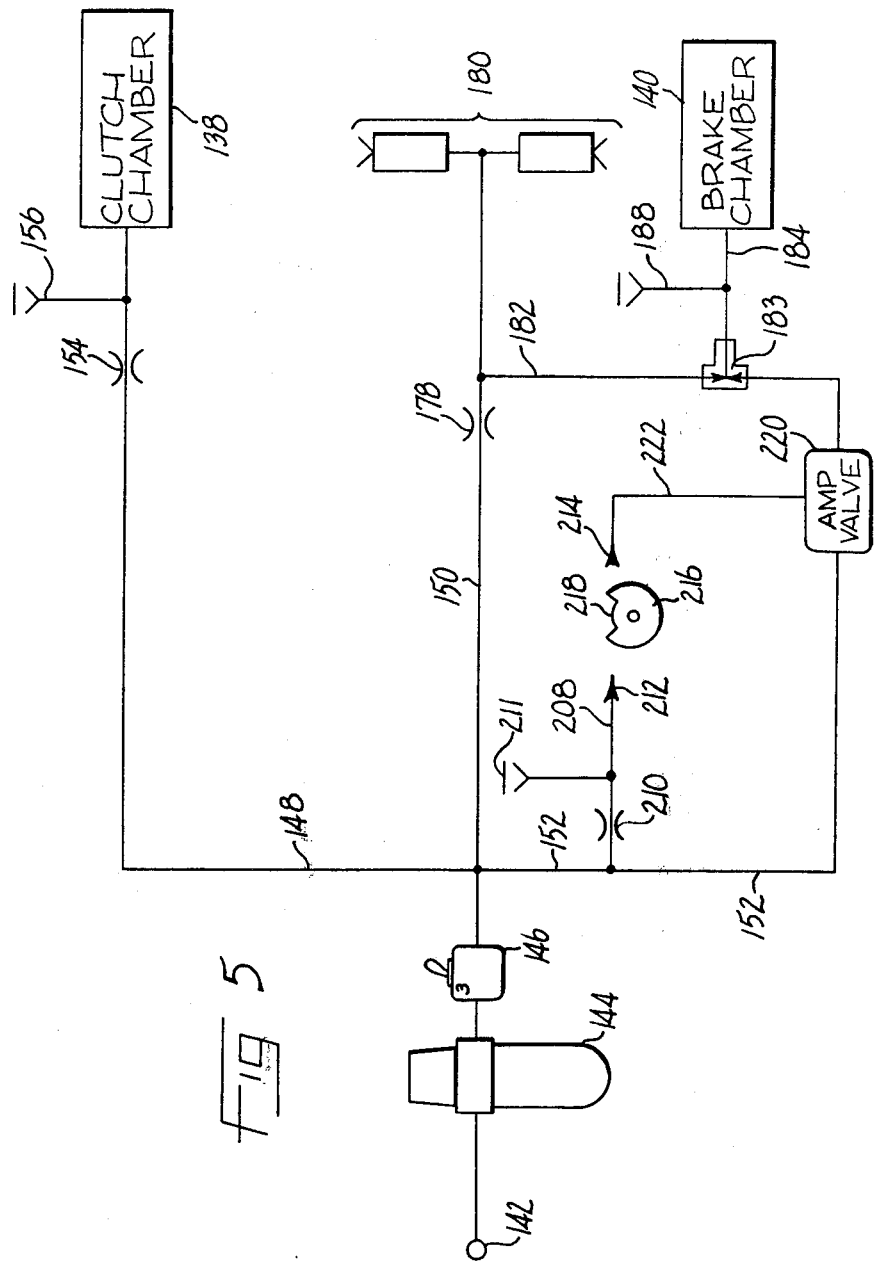
FIG. 5 is a schematic circuit diagram of one embodiment of the pneumatic control circuit utilized in accordance with the invention.

As shown in FIG. 5, the end of line 208 opposite its connection with line 152 has an air jet nozzle 212 formed thereon. This nozzle is adapted to project the air in line 208 as a jet of air into a receiver 214 located on the opposite side of a rotary valve 216. The valve 216 is operatively connected on the drive shaft of the sewing head 20 adjacent pulley 30 for rotation therewith. This valve has an elongated slot 218, as shown in FIG. 7, formed in the peripheral surface thereof through which air from jet 212 may pass to receiver 214 during rotation of the valve. The rotary valve 216 is mounted on the drive shaft of the sewing machine in a predetermined position so that slot 218 is between the nozzle and jet nozzle 212 and receiver 214 when the needle bar 22 is in a proper position, e.g. the up position. During normal operation of the sewing machine, since air escapes through exhaust port 211, there is no air jet projected from nozzle 212, and rotary valve 216 does not interfere with the operation of the device. However, when the sewing operation is to be momentarily stopped or is completed, pressure on foot pedal 32 is relieved, which allows lever 38 to move back into the position illustrated in FIG. 2 to close port 211, a portion of the air supplied through line 152 passes through restriction 210 to nozzle 212 where it is passed in a jet to receiver 214. The remainder of the air in line 152 passes directly to amplifier valve 220. The latter valve is of conventional construction and, when no air is applied thereto through line 222 from receiver 214, the valve is opened to exhaust so that any air in line 152 is exhausted to the atmosphere. On the other hand, when air pressure is present in line 222, amplifier valve 220 connects air in line 152 to valve 183.

When pressure on foot pedal 32 is relieved, the only pressure on poppet valve 160 is the reference pressure applied by spring 168 so that only the reference air pressure is present in chamber 138 to cause the friction surface 92 to engage flywheel 60 lightly to drive shaft 26 at a relatively low speed. This causes the shaft to rotate until slot 218 is presented between nozzle 212 and receiver 214. As this occurs, the jet of air projected by nozzle 212 is received in receiver 214 and passes through line 222 to operate amplifier valve 220. When this occurs, the full air pressure present in line 152 passes to valve 183 and from there to brake chamber 140. The air pressure thus supplied to brake chamber 140 is substantially greater than the reference pressure maintained in chamber 138 so that that pressure is overcome and the surface 96 of the disc 90 is immediately brought into contact with brake surface 88 in order to stop shaft 26 immediately. If the shaft does not stop within the path of its arcuate movement defined by slot 218, air from jet 212 is blocked from receiver 214 so that amplifier valve 220 is returned to its exhaust condition. The reference pressure in chamber 138 remains operative to control shaft 26 until slot 218 again is presented between nozzle 212 and 214. This would normally only occur when foot pedal 32 is rapidly released when the machine is running at a relatively high speed. Upon sudden release of the foot pedal 32, pressure in chamber 140 will be greater than the reference pressure in chamber 138 under the influence of transducer 180 so that the disc 90 is engaged with brake surface 88 to slow down shaft 26 progressively. At a low speed, such as the reference speed, the shaft will stop within the arcuate distance defined by slot 218 so that the needle bar is stopped at or adjacent its predetermined position. It is noted that the use of a reference pressure in the system is highly advantageous since it assures an accurate stopping of the shaft. This occurs because the shaft can be quickly stopped within a given distance as defined by slot 218 when the machine is operating at this slow speed and will continue to turn for a full revolution if it cannot be stopped at the first attempt.

It is noted that valve 183 which connects lines 182 and valve 220 to line 184 constitutes a valve body having two check valves therein. Each of the check valves will permit passage of air therethrough in the direction indicated by the arrowheads in the drawing but will prevent passage of air in the opposite direction. Therefore, valve 183 will only permit the passage of air through it from the line which has the greater pressure while preventing the air from that line from entering the other line. Thus, during the operation of the device, when line 152 is connected to exhaust through amplifier valve 220, and air is supplied through line 182 under the control of transducer 180, the air pressure in line 182 is greater than the air pressure in line 152 so that the check valve permits the air to flow to brake chamber 140 but not into line 152. Alternatively, when the device is operating at the reference pressure, an amplifier valve is operated to permit air to pass therethrough (i.e., when slot 218 is between jet 212 and nozzle 214), the pressure from valve 220 is greater than the pressure in line 182 so that pressure is supplied to the brake chamber while the check valve closes line 182 to prevent escape of air from line 152 into line 182 and out through transducer 180.

Accordingly, it is seen that a relatively simple and inexpensive arrangement is provided for controlling the drive and braking of a sewing machine drive shaft, while assuring that the sewing machine will automatically stop with its needle bar in a predetermined position. This predetermined position could be either the up or the down position.

In either case, the operation of the device is as follows: As the operator applies pressure to foot pedal 32 to actuate lever 38, spring 166 applies an increased biasing force to poppet 160 to limit the escape of air from the line 148 that leads to the chamber 138, thereby increasing the air pressure in that chamber. Increased pivotal motion of lever 38 increases the spring force applied by spring 166 and thus causes a further increase in pressure in chamber 138. This increased pressure increases the engagement pressure between the clutch and the flywheel to increase the drive speed of shaft 26. Simultaneously, the transducer 180 is operated to vary the pressure in chamber 140 in accordance with the speed at which shaft 26 is operated. This pressure, which will fluctuate in accordance with the drive speed, opposes the pressure in chamber 138 in order to provide a more gradual speed relationship which enables the operator to select a random drive speed. When lever 38 is held in a constant position, pressure in chamber 140 may initially fluctuate for a very short period of time until a steady pressure is reached in chamber 140, which substantially balances the pressure in chamber 138 so that the shaft is driven at a constant speed. Further depression of foot pedal 32, and thus pivotal motion of lever 38, causes bolt 206 to open valve 186 causing all air supplied to chamber 140 to escape from that chamber, thereby eliminating all opposition to the pressure in chamber 138 and causing the full force of that pressure to be applied to the piston 132 so that disc 90 is tightly engaged with flywheel 60 to drive the machine at high speeds.

At the completion of the sewing operation, foot pedal 32 is released by the operator, and lever 38 returns to the position illustrated in FIG. 2 under the influence of spring 174. As this occurs, exhaust port 211 in line 208 is closed by engagement with the valve seat on housing 16, causing a jet of air to be projected through nozzle 212 to receiver 214 to stop the drive of shaft 26 as described above.

FIGS. 8 through 10 illustrate one type of amplifier valve that can be used in the circuit diagram of FIG. 5. This valve includes a body 232 and a slide or control plate 234. The latter is connected at one end to a spring 236 which biases the plate 234 into the position illustrated in FIG. 8, which, as will be more fully described hereinafter, is the exhaust position of the valve. The opposite end of plate 234 includes an enclosed housing 238 in which a piston 240 is slidably mounted. The piston has an air port 242 therein which is adapted to be connected to the line 222 of the pneumatic circuit diagram in FIG. 5.

Valve body 232 has a pair of ports 244 and 246, with port 244 open to the atmosphere as an exhaust line and port 246 connected through a conduit to valve 183. In addition, valve body 232 includes a port 248 through which air is supplied to the valve body from line 152 and one or more additional ports 250 which may be utilized for the purposes hereinafter described. Plate 234 includes a plurality of openings 252a–252c therein, one of which, 252b, provides intercommunication between the port 248 and ports 244 and 246, alternately. When the amplifier valve is in the exhaust position illustrated in FIG. 8, air supplied to port 248 from line 152 passes through opening 252b in plate 234 to exhaust port 244. On the other hand, when the amplifier valve is actuated by a pilot pressure in port 242, the plate 234 is pushed to its alternative position shown in FIG. 9, and opening 252b interconnects port 248 with port 246 to supply air to valve 183.

Since air pressure will at all times be entering port 248 from line 152, some of the air will bleed around opening 252b, on either side of plate 234, as illustrated in FIG. 10, thereby acting as an air bearing, equalizing the force of the air, reducing friction, and permitting plate 234 to be rapidly shifted. One of the desirable characteristics of this valve is the fast response time achieved thereby due to the low mass and low friction of the shuttle plate 234 and piston 240.

Figure 11:
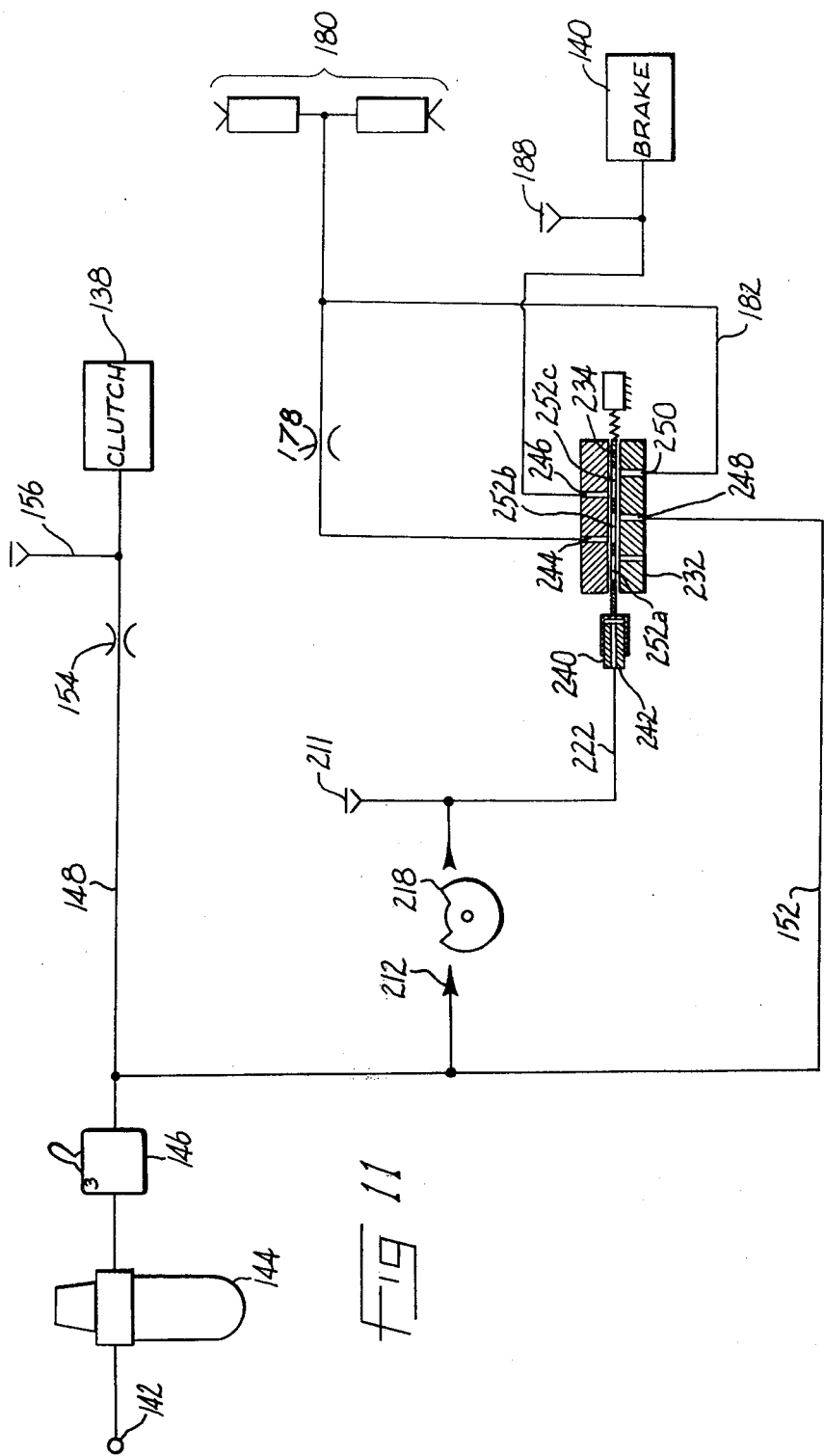
FIG. 11 is a schematic circuit diagram of another pneumatic control circuit arranged in accordance with the invention.

This amplifier valve construction may also be utilized to modify and simplify the pneumatic circuit illustrated in FIG. 5. This arrangement is illustrated in FIG. 11 wherein it is seen that line 152 remains connected to port 248. However, in this case, port 244, previously utilized as an exhaust port, is connected to restriction 178 in lieu of line 150, so that, during the operation of the device, when no air pressure is supplied through line 222 to piston 240, air flowing in line 152 will pass through port 244 to transducer 180. In addition, valve 183 is eliminated, and line 182 is connected to the right port 250 of the valve body 232. When the speed control of the foot pedal 32 is depressed with the valve 232 in the condition shown in FIG. 11, air from the line 152 passes through port 248, opening 252b and port 244 to transducer 180 and to the brake chamber 140 via line 182, the righthand port 250, opening 232c and port 246. The transducer can thus operate normally.

When the machine is to be stopped and the lever 38 is returned to its original position illustrated in FIG. 2, exhaust port 211 is closed, causing a pilot pressure to be presented in line 22, when slot 218 is located between nozzle 212 and receiver 214, so as to move plate 234 to the right, into the configuration illustrated in FIG. 9. In this configuration, air pressure from line 152 will pass through port 246 to the brake chamber 140 while air pressure, if any, supplied through line 182 from transducer 180 will be blocked so that it will all escape through the transducer. On the other hand, port 244 is connected to exhaust through the slot 252a in a plate 234 and port 250 at the left of the block 232 so that no air pressure will be present in line 182.

Accordingly, it is seen that the device, modified in this manner and utilizing the particular amplifier valve illustrated, operates in the same manner as the system illustrated in FIG. 5. This arrangement is somewhat more efficient because the air to the transducer 180 is shut off during operation of valve 218 thereby eliminating the normal air bleed after the machine is stopped as occurs in the embodiment of FIG. 5. As a result, there is substantially less air consumption. Further, the shuttle valve 183 is eliminated, thereby further simplifying the circuit.

Accordingly, it is seen that both embodiments of the invention are relatively simple and inexpensive in construction and achieve a controlled driving speed for the output shaft of the sewing machine, while assuring that the machine will be stopped with the needle in a predetermined position. In addition, the invention and the various components thereof may be utilized to drive and control the operation and drive of many other types of motor driven machines.

Although illustrative embodiments of the present invention have been described herein with reference to the accompanying drawings, it is to be understood that the invention is not limited to those precise embodiments and that various changes and modifications may be effected therein by one skilled in the art without departing from the scope or spirit of this invention.

What is claimed is:

1. In a machine having a rotary device shaft and a pneumatically operated clutch system including air supply means, a plurality of pressure chambers connected directly to said air supply means to receive air for controlling the clutch, means for varying the air pressure in one of said chambers comprising means mounted on said drive shaft for rotation therewith and defining at least one exhaust port extending generally radially from said drive shaft and having an exhaust opening remote from said shaft, a weight slidably mounted on the last-mentioned means for closing said opening with a force proportional to the speed of rotation of said shaft, as the speed of rotation of said shaft is increased, under the influence of centrifugal force, and means connecting said exhaust port to said air supply means at a point therein between a source of pressurized air and said one chamber, said exhaust port being normally open whereby air from said source escapes through said exhaust opening when said shaft is at rest, and the pressure in said one chamber is increased as the speed of rotation of said shaft is increased, due to the progressive closure of said exhaust opening by said weight when said shaft is rotated.

* * * * *